United States Patent [19]

Furukawa et al.

[11] 4,415,195
[45] Nov. 15, 1983

[54] AUTOMOBILE WINDOWS

[75] Inventors: Akira Furukawa, Hamamatsu; Minoru Araki, Shizuoka; Hideyuki Genma, Hamamatsu, all of Japan

[73] Assignee: Suzuki Motor Company Limited, Japan

[21] Appl. No.: 253,578

[22] Filed: Apr. 13, 1981

[30] Foreign Application Priority Data

Apr. 30, 1980 [JP] Japan .................. 55-57460

[51] Int. Cl.³ ............................... B60J 7/04
[52] U.S. Cl. ................................ 296/146; 296/216; 49/41
[58] Field of Search ............... 296/146, 216, 222, 155; 49/41, 40, 39

[56] References Cited

U.S. PATENT DOCUMENTS

| | | | |
|---|---|---|---|
| 2,651,541 | 9/1953 | Surles | 296/155 |
| 2,938,749 | 5/1960 | Podolan et al. | 296/146 |
| 3,036,860 | 5/1962 | Geiger | 296/216 |
| 4,157,845 | 6/1979 | Queveau | 296/220 |

FOREIGN PATENT DOCUMENTS 810698 8/1951 Fed. Rep. of Germany ...... 296/155

Primary Examiner—Robert R. Song
Attorney, Agent, or Firm—McGlew and Tuttle

[57] ABSTRACT

Automobile windows on both sides of the vehicle are curved inwardly and arcuately toward the top of the compartment and are made separate from the doors and slidably abutted at least at the front edges on the support frame for the windshield, at least either of the side windows being made openable by sliding them upwardly. When opened, they are accommodated in recesses formed for that purpose in the roof that covers a middle part of the ceiling space above the car body. Alternatively, the windows extend toward each other until their upper edges overlap along the central longitudinal line of the ceiling space above the car body, the windows being made slidable relative to each other, one over the other in a superposed relation, so that either window, when opened, is partly or fully superposed, as desired, parallelly over or under the other.

8 Claims, 14 Drawing Figures

AUTOMOBILE WINDOWS

FIELD AND BACKGROUND OF THE INVENTION

This invention relates to side windows for automobiles, made separate from the doors and curved inwardly and arcuately toward the roof so that they can be opened by moving them toward the roof.

Side windows for automobiles have been available in a variety of structures. Generally, the windows of the type that, when opened, are housed in the doors are predominant. The arrangements are complex in construction and heavy in weight, with little possibility of cost reduction, and it has been difficult to provide structures which would look light and sporty.

SUMMARY OF THE INVENTION

The present invention has been perfected with the foregoing in view. The object of the invention is to provide side windows which are separate from the doors and are curved inwardly toward the top of the compartment so that they can move toward the roof for window opening. The invention thus aims at simplifying the door structure and reducing its weight, thereby cutting the cost. Another object is to enable the vehicle to have a generally light construction and sporty appearance and permit improvements in designs, an important factor in making automobiles, particularly sports cars.

BRIEF DESCRIPTION OF THE DRAWINGS

The above and other objects, features, and advantages of the invention will become more apparent from the following description taken in conjunction with the accompanying drawings, wherein.

DESCRIPTION OF THE PREFERRED EMBODIMENTS

Figure 1:
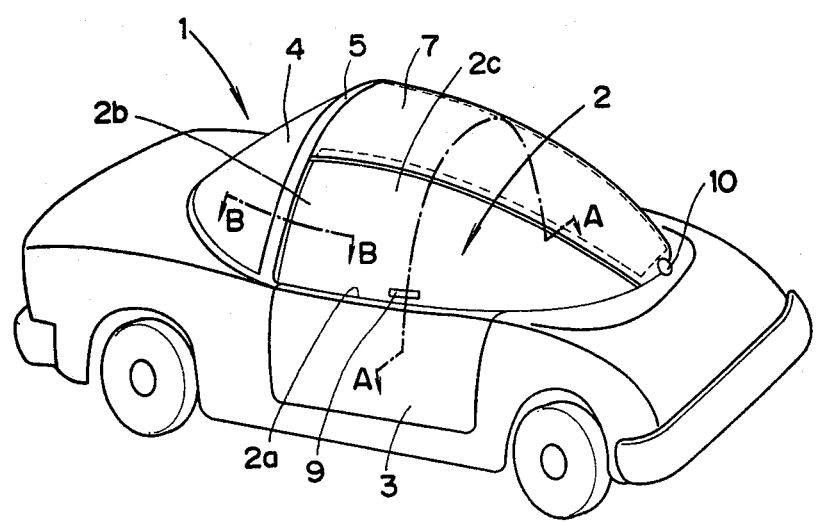
FIG. 1 is a perspective view of an automobile incorporating one embodiment of the windows of the invention.
Figure 2:
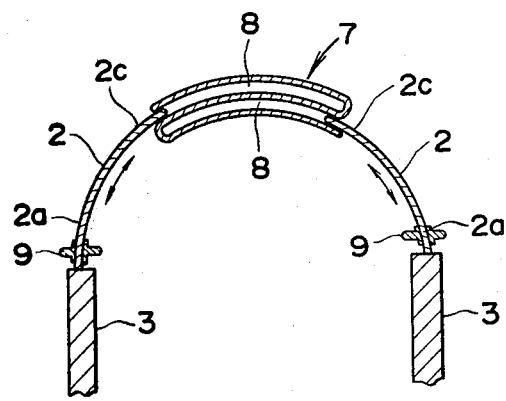
FIG. 2 is a sectional view taken on the line A—A of FIG. 1.
Figure 3:
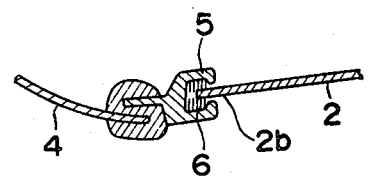
FIG. 3 is a sectional view taken on the line B—B of FIG. 1.

Referring now to FIGS. 1 through 3, which show an embodiment of the invention, the numeral 1 designates a car body, of a sports car in this case. Windows 2 on both sides of the body 1 are made separate from doors 3. The side windows 2 are arcuately bent from the upright lower part toward the top of the compartment of the vehicle, and gradually narrows down rearwardly, each forming a generally triangular curvature. Their lower edges 2a ride on sill-like tops of the doors 3 and the rear panel part of the body 1. Their front edges 2b abut on an inverted-U-shaped support frame 5 holding a windshield 4 securely. The support frame 5 has a guide groove 6 formed along the rear side to slidably receive the front edges 2b of the side windows 2. Between a middle part of the support frame 5 and the middle part of the sill on the rear panel part of the body extends a roof 7, which also provides a ceiling for the compartment. The roof 7 is of a folded or multilayer structure providing two arcuately curved recesses 8 open at alternate sides to receive normally the upper edges 2c of the side windows 2. Handles 9 are fitted to proper matching points, on the outer and inner faces, of the windows near their lower edges 2a.

With the construction so far described, the side windows are handled in the following way. As the driver or a passenger holds the handle 9 of either window 2 and exerts an upward or downward force, the window will move upwardly or downwardly, as indicated by the arrows in FIG. 2, guided by the support frame 5 of the windshield 4 in cooperation with a flucrum 10 for the windows provided in the rear part of the car body. Thus, when the side window 2 is opened by the upward force exerted on the handle, the transparent screen is moved toward the roof 7 and is housed in the associated recess 8. Conversely when the window 2 is closed by the downward force, it is pulled out from the roof recess 8 until its lower edge 2a closely rests on the sills at the tops of the door 3 and the rear panel part of the car body to close the compartment tightly.

When getting into or out of the car, the driver or passenger first raises the side window 2 he or she faces in the manner described and then opens the door 3.

The side windows 2 can be partly opened or closed and held at any desired point. The roof 7 may include a built-in power window regulator which is driven, for example, by an electric motor for automatic window opening and closing. The regulator itself may be of a conventional design, and the description of the mechanism is omitted. Also, either the roof 7 and the side windows 2 or the windows alone may be made demountable so that the vehicle can serve as a full or partial open car when desired.

The afore-described construction greatly simplifies door structure and reduces the weight to a considerable extent. It permits the vehicle to be designed to have, as a whole, a light, sporty appearance. When applied to a sports car, for example, the invention offers a wide choice of design modifications. The windows, which open unusually wide (and, of course, can remain in any desired part-open positions), provide good ventilation and, when fully open, allow the occupant to feel much relieved and refreshed.

Figure 4:
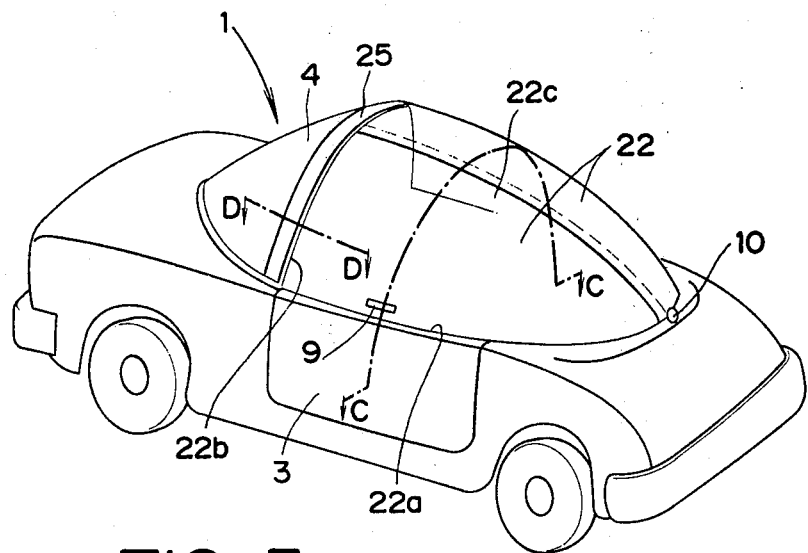
FIG. 4 is a perspective view of an automobile incorporating another embodiment of the invention.
Figure 5:
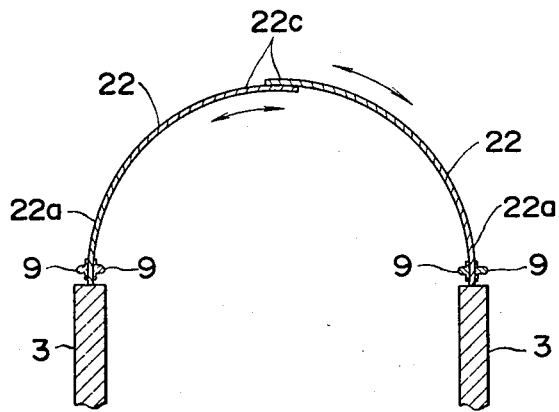
FIG. 5 is a sectional view taken on the line C—C of FIG. 4.
Figure 6:
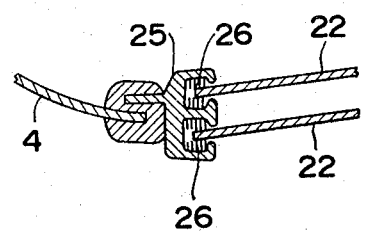
FIG. 6 is a sectional view taken on the line D—D of FIG. 4, showing the windows superposed on one side.
Figure 7:
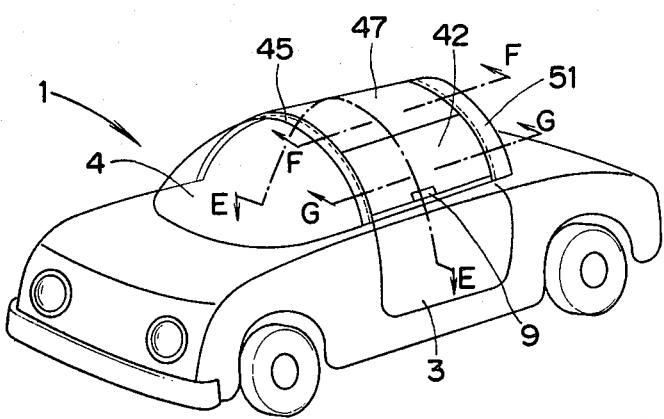
FIG. 7 is a perspective view of an automobile incorporating still another embodiment of the invention.
Figure 8:
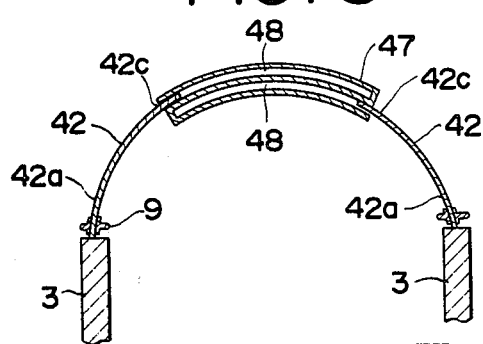
FIG. 8 is a sectional view taken on the line E—E of FIG. 7.
Figure 9:
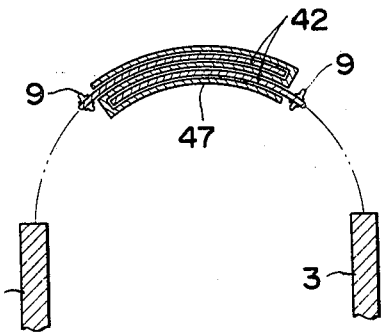
FIG. 9 is a sectional view similar to FIG. 8 but showing the side windows accommodated in the roof.
Figure 10:
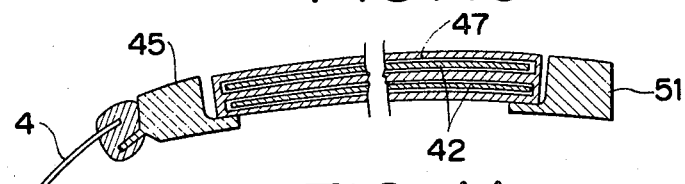
FIG. 10 is a sectional view taken on the line F—F of FIG. 7, partly broken away for simplicity.
Figure 11:
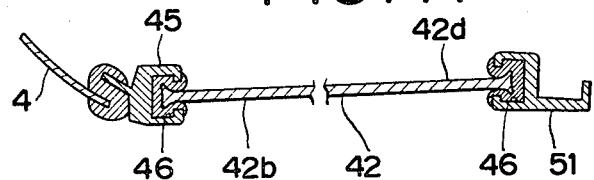
FIG. 11 is a partly-broken, sectional view taken on the line G—G of FIG. 7.

FIGS. 4 to 6 illustrate another embodiment of the invention. This embodiment is basically the same in construction as the preceding one, with the exception that it dispenses with the roof 7 that also forms the ceiling for the compartment of the vehicle and uses, instead, larger side windows 22 which extend toward each other until their upper edges 22c overlap substantially along the central longitudinal line of the ceiling space. Both the windows 22 are slidable relative to each other, one over the other in a superposed relation, so that they can combinedly constitute the ceiling for the car. The parts other than those mentioned above are like or similar to the counterparts of the embodiment shown in FIGS. 1 to 3, and are given like reference numerals and the description is omitted. The same applies to the other embodiments that will follow. With the foregoing construction, either of the side windows 22 (usually the one beside the driver's seat) is opened as it is lifted by the handle toward the other, parallelly over or under the latter, until the two are partly or fully superposed as desired. For these purposes the support frame 25 of the windshield 4 has a pair of parallel guide grooves 26 formed on the rear side to receive the front edges of the two side windows 22.

While the side windows 22 have been described as slidable with respect to each other, it is alternately possible to fix either of them and make only the other movable.

As compared with the previous embodiment, the roofless construction makes possible further simplification and weight reduction of the vehicle, provides greater freedom from design limitations, and enables the driver to have an open, airy feeling more like that in an open car.

Still another embodiment is shown in FIGS. 7 through 11. This embodiment again is basically the same as the first, excepting that a rear support frame 51 of the same configurations as a support frame 45 for the windshield 4 is provided on the rear part of the car body 1, whereby side windows 42 are supported slidably along both the frames 45, 51. A roof 47 is held between those frames. The support frames 45, 51 have, respectively, rearwardly and frontwardly opened square-C-shaped guide grooves 46 to receive securely the front and rear edges 42b, 42d of the side windows 42.

Like the counterpart in the first embodiment, the roof 47 has recesses 48 which normally receive the upper edges 42c of the side windows 42. It may, of course, incorporate a power window regulator, for example, of a motor-driven type. Also, the roof 47 or the side windows 42 or both may be made detachable so that the vehicle can be used as a full open car when necessary.

This construction enables the side windows 42 to be supported more positively and to slide more smoothly than in the preceding embodiments.

Figure 12:
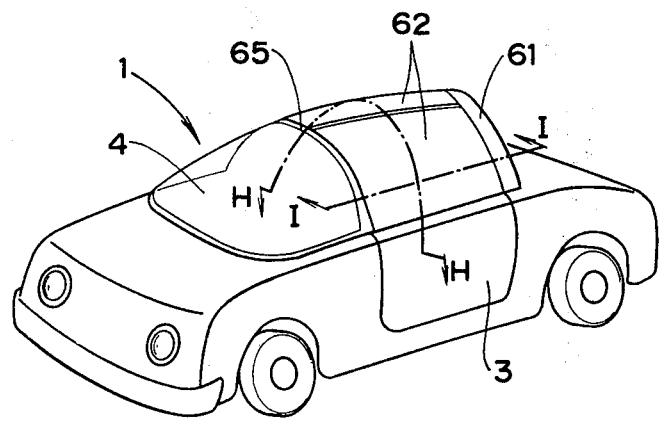
FIG. 12 is a perspective view of an automobile incorporating a further embodiment of the invention.
Figure 13:
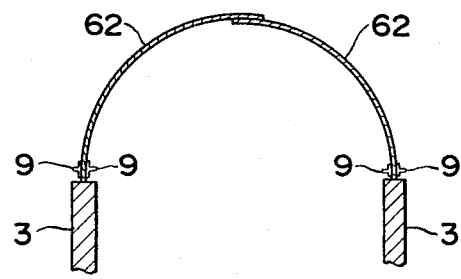
FIG. 13 is a sectional view taken on the line H—H of FIG. 12.
Figure 14:
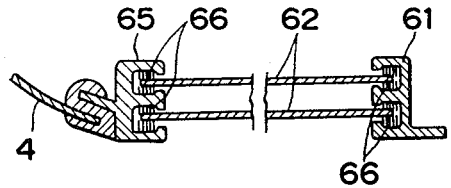
FIG. 14 is a sectional view taken on the line I—I of FIG. 12, showing the windows superposed on one side and partly broken away for simplicity.

FIGS. 12 to 14 show a further embodiment of the invention. In this case the roof 47 that forms the ceiling for the compartment of the vehicle embodied in FIGS. 7 through 11 is eliminated, and both side windows 62 combinedly constitute the ceiling. The windows 62 are supported at the front and rear edges by guide grooves 66 formed in front and rear support frames 65, 61.

In the same manner as in the embodiment shown in FIGS. 4 to 6, either of the side windows 62 may be fixed, leaving the other movable.

This embodiment supports the side windows 62 more securely and allows them to slide more smoothly than in the preceding arrangements. Moreover, further simplification in construction and reduction in weight are made possible with consequent increases in openness and in freedom of design.

Of the embodiments so far described, those which have separate roofs may use transparent ones to give added openness to the vehicles.

As will be obvious from the foregoing description, it is possible in accordance with the invention to simplify the construction and reduce the weight of doors, thus cutting the cost accordingly. Furthermore, the vehicles can be given light, sporty appearances, and hence the freedom of designing, an important element in making automobiles, particularly sports cars, is markedly improved and windows of excellent structures with unusual openness and airiness are provided.

What is claimed is:

1. An automobile window structure for an automobile having a roof, at least one door and a windshield, comprising:

a windshield frame connected to the windshield and having a slide guide;

a window on each side of the automobile at least one of which is slidable in said slide guide, each slidable window being curved outwardly and arcuately with respect to an interior of the automobile by a selected radius, said slide guide having the same selected radius for permitting each slidable window to slide by any selected amount into said guide from a fully closed to a fully open position, each slidable window being separate from a door of said automobile adjacent each slidable window respectively, and openable away from the respective door;

the roof of the automobile having a recess for receiving each of said slidable windows with at least a portion of each slidable window in said recess in a closed position of each slidable window, said recess for each slidable window having said selected radius;

each of said windows being slidable, said roof having two recesses, one for each window, said recesses being one above the other so that, with both of said windows in an open position, said windows substantially overlap each other.

2. An automobile window structure according to claim 1, wherein said roof comprises a folded multilayered structure for defining each recess.

3. An automobile window structure according to claim 1, wherein said windows in their open substantially overlapping position are substantially parallel to each other.

4. An automobile window structure according to claim 1, wherein each of said windows is in the form of a curved triangle having a fulcrum about which each window moves positioned rearwardly of said windshield frame.

5. An automobile window structure according to claim 1, including a rear frame spaced rearwardly of said windshield frame having a second slide of said selected radius, each slidable window having respective forward and rear edges slidably engaged respectively in said first mentioned and second slide guides.

6. An automobile window structure for an automobile having a roof, at least one door and a windshield, comprising:

a windshield frame connected to the windshield and having a slide guide;

a window on each side of the automobile at least one of which is slidable in said slide guide, each slidable window being curved outwardly and arcuately with respect to an interior of the automobile by a selected radius, said slide guide having the same selected radius for permitting each slidable window to slide by any selected amount in said guide from a fully closed to a fully open position, each slidable window being separate from a door of said automobile adjacent each slidable window respectively, and openable away from the respective door;

the roof of the automobile having a recess for receiving each of said slidable windows with at least a portion of each slidable window in said recess in a closed position of each slidable window, said recess for each slidable window having said selected radius;

each of said windows being slidable, said roof having two recesses, one for each window, said recesses being one above the other so that, with both of said windows in an open position, said windows substantially overlap each other;

said roof comprising a folded multilayered structure for defining each recess.

7. An automobile window structure for an automobile having a roof, at least one door and a windshield, comprising:

a windshield frame connected to the windshield and having a slide guide;

a window on each side of the automobile at least one of which is slidable in said slide guide, each slidable window being curved outwardly and arcuately with respect to an interior of the automobile by a selected radius, said slide guide having the same selected radius for permitting each slidable window to slide by any selected amount in said guide from a fully closed to a fully open position, each slidable window being separate from a door of said automobile adjacent each slidable window respectively, and openable away from the respective door;

the roof of the automobile having a recess for receiving each of said slidable windows with at least a portion of each slidable window in said recess in a closed position of each slidable window, said recess for each slidable window having said selected radius;

each of said windows being slidable, said roof having two recesses, one for each window, said recesses being one above the other so that, with both of said windows in the open position, said windows substantially overlap each other; and each of said windows being in the form of a curved triangle having a fulcrum above which each window moves positioned rearwardly of said windshield frame.

8. An automobile window structure for an automobile having at least one door and a windshield, comprising:

a windshield frame connected to the windshield having a pair of parallel slide guides;

a window on each side of the automobile, each slidable in one of said slide guides, each slidable window being curved outwardly and arcuately with respect to an interior of the automobile by a selected radius, each slide guide having substantially the same selected radius for permitting each slidable window to slide by any selected amount in each slide guide from a fully closed to a fully opened position, each slidable window being separate from a door of the automobile adjacent each slidable window respectively, each slidable window being openable from each respective door;

said window on each side of the automobile being curved outwardly and over a top of the automobile so that upper edges of each window overlap each other at least partially in a fully closed position of both of said windows, said windows substantially overlapping each other and extending parallel to each other in a fully open position of one of said slidable windows;

both of said windows being slidable, said windshield frame having a pair of parallel extending slide guides, one for each slidable window, each of said slidable windows being in the form of a curved triangle having a fulcrum of movement positioned rearwardly of said windshield frame.

* * * * *